United States Patent [19]
Peschka et al.

[11] Patent Number: 5,438,961
[45] Date of Patent: Aug. 8, 1995

[54] METHOD FOR OPERATING A HYDROGEN ENGINE, MOTOR-VEHICLE DRIVE

[75] Inventors: Walter Peschka, Sindelfingen; Gottfried Schneider, Stuttgart, both of Germany

[73] Assignee: Deutsche Forschungsanstalt fuer Luftund Raumfahrt e.V., Bonn, Germany

[21] Appl. No.: 166,710

[22] Filed: Dec. 14, 1993

[30] Foreign Application Priority Data

Dec. 17, 1992 [DE] Germany .................. 42 42 644.8

[51] Int. Cl.[6] ............................. F02B 43/08
[52] U.S. Cl. ................ 123/3; 123/DIG. 12
[58] Field of Search ........... 123/DIG. 12, 527, 3; 62/7, 53.2

[56] References Cited

U.S. PATENT DOCUMENTS

| 4,570,578 | 2/1986 | Peschka et al. | 123/DIG. 12 |
| 5,127,230 | 7/1992 | Neeser et al. | 123/527 |
| 5,315,831 | 5/1994 | Goode et al. | 123/527 |

FOREIGN PATENT DOCUMENTS

| 0318904 | 6/1989 | European Pat. Off. | 123/DIG. 12 |
| 2808973 | 9/1979 | Germany | 123/DIG. 12 |

Primary Examiner—Henry C. Yuen
Assistant Examiner—Erick Solis
Attorney, Agent, or Firm—Barry R. Lipsitz

[57] ABSTRACT

In order to provide a method for operating a motor-vehicle engine adapted to be driven by hydrogen gas, wherein hydrogen gas is compressed to an operational pressure level required for the high-pressure injection, which also enables a hydrogen engine to be operated at a storage pressure of the hydrogen gas conveyed in the motor vehicle which is below the operational pressure level required for the high-pressure injection, it is suggested that the hydrogen gas at a pressure below the operational pressure level be cooled to cryogenic temperatures and that the cold gas be compressed by means of a compressor operating at cryogenic temperatures and heated up again in the compressed state.

24 Claims, 1 Drawing Sheet

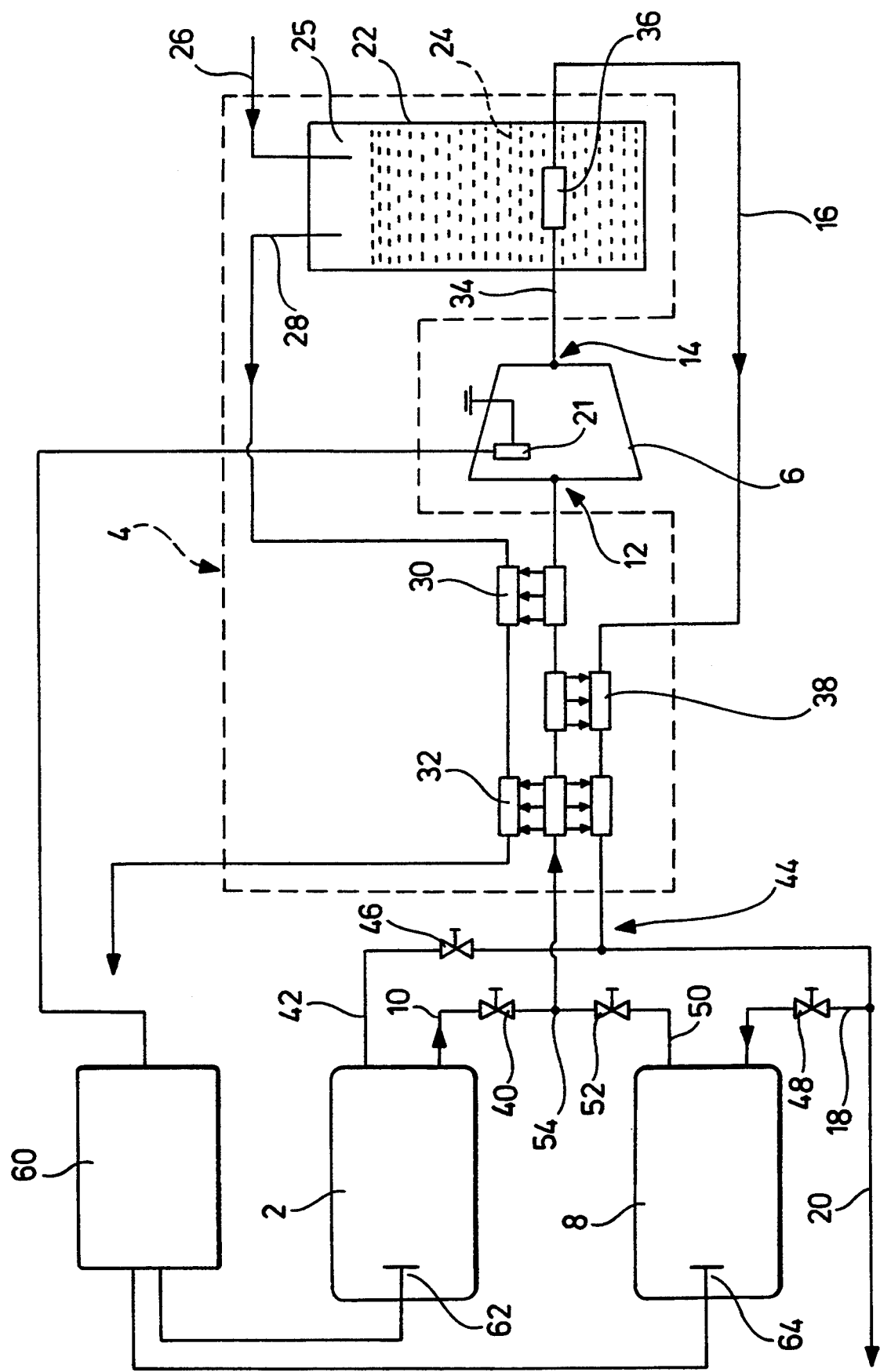

METHOD FOR OPERATING A HYDROGEN ENGINE, MOTOR-VEHICLE DRIVE

The invention relates to a method for operating a motor-vehicle engine adapted to be driven with hydrogen gas, in which hydrogen gas is compressed to an operational pressure level required for the high-pressure injection.

In addition, the invention relates to a motor-vehicle drive comprising a hydrogen engine and a means for increasing the pressure of hydrogen gas conveyed in a first pressure-gas storage means to an operational pressure level required for the high-pressure injection in the hydrogen engine.

The high-pressure injection in hydrogen-operated motor vehicle engines is necessary for achieving the engine characteristics corresponding to the present standard of engines operated with conventional fuel; in the interests of a good internal mixture formation and short injection periods, a minimum injection pressure of approximately 150 bar is customarily assumed. However, for a maximum storage pressure in the range of approximately 200–300 bar within a storage means for hydrogen pressure gas conveyed with the vehicle, this results in a maximum possible utilization of only 50% of the hydrogen gas conveyed in the pressure-gas storage means for the combustion in the hydrogen engine. Problems also arise when filling the storage means of hydrogen-operated vehicles because at the "gas stations" the minimum injection pressure of at least approximately 150 bar must be available, and for "filling up" even the maximum storage pressure in the range of between 200 and 300 bar and this is, from a technical point of view, enormously complicated and hardly acceptable when taking the technical safety requirements into consideration.

This situation could be met by using a system for increasing pressure in the vehicle in the form of a conventional compressor. The compression to the operational pressure level required for the high-pressure injection, by means of a compressor of a conventional construction, would, however, entail considerable difficulties since such a compressor is too voluminous and too heavy and, in addition, unsuitable for use in motor vehicles due to the power requirements of its drive.

The object underlying the invention is, therefore, to provide a method and a device of the type described at the outset which also enable a hydrogen engine to be operated at a storage pressure of the hydrogen gas conveyed in the motor vehicle which is below the operational pressure level required for the high-pressure injection.

This object is accomplished in the method described at the outset in that the hydrogen gas at a pressure below the operational pressure level is cooled to cryogenic temperatures and that the cold gas is compressed by means of a compressor operating at cryogenic temperatures and heated again in the compressed state.

Due to the fact that the compression of the gaseous hydrogen for the high-pressure injection is carried out at cryogenic temperatures, the compressor used for this compression, which operates at cryogenic temperatures, can be of considerably smaller dimensions, due to the lower specific gas volume of the cold hydrogen, than if compression were carried out at "room temperature". If, for example, compression is carried out at a temperature of approximately 70° Kelvin, the geometrical dimensions as well as the drive requirements of the "cold" compressor can be reduced approximately by the factor 4–5 in relation to a compressor operating at ambient temperature.

Although the gas to be compressed can, within the meaning of the invention, be cooled in any optional manner, i.e., for example, by using any optional thermal motor, it has proven to be particularly advantageous for the hydrogen gas which is to be compressed to be cooled by means of a cryogenic medium. A cryogenic medium is to be understood in this respect as fundamentally any substance which is cooled to cryogenic temperatures and suitable for the specific use, i.e., in particular, liquid nitrogen or oxygen or liquid argon or their vapors.

In view of the heavy and voluminous pressure-gas storage means which receive the hydrogen gas taken along and which, due to the mass portion of the hydrogen stored therein which is only about 2%, can accommodate hardly more than about 10–15 kg of hydrogen (which corresponds to 40–60 1 of petrol equivalent) even in commercial vehicles, such as trucks or buses, the resources required for taking along the amount of cryogenic medium necessary for carrying out the inventive method are relatively small. For example, for cooling one kilogram of hydrogen only about 0.65 kg (0.8 1) of liquid nitrogen are required in the most favorable case. On account of the infrastructure developed up to the present time, no problems are to be expected with the supply of, in particular, liquid nitrogen.

With a view to performing the method in the most economic way possible, it is recommended that the gas to be compressed and the compressed gas be cooled and heated, respectively, by means of a counterflow heat exchanger system.

When cooling by means of a cryogenic medium, it is, in addition, advantageous to exploit the cooling capacity of the vapors, the so-called cold gas enthalpy, to as great an extent as possible by using the vaporizing cryogenic medium to cool the gas to be compressed in that these vapors are conducted, for example, along pipes conveying the gas to be cooled.

The energy or power required by the compressor for compressing the gaseous hydrogen, which is cooled to cryogenic temperatures, to a predeterminable pressure is reduced further in accordance with the invention when the compression is essentially carried out isothermally, i.e. when the heat resulting during the course of compression is immediately drawn off.

The compressor can be driven in any optional manner for carrying out the inventive method but preferably by the motor-vehicle engine. When carrying out the inventive method, the possibility is also given of using the compressor for the regenerative braking of the vehicle in that it is driven on the motor side or the gear side when the vehicle is intended to be braked and thereby loads the motor or the gear and contributes to reducing the speed of the vehicle.

Insofar as cryogenic argon or cryogenic nitrogen or another cryogenic medium, which has protective gas properties at an ambient temperature, is used for cooling, their vapors can, in a further development of the inventive method, be used for forming a protective gas sheath around parts of the motor vehicle which are critical from a safety point of view.

In addition, it is also conceivable and advantageous for the cryogenic medium is to be used for the cooling or air-conditioning of the passenger compartment or even the cargo or luggage space of the vehicle.

It has proven to be particularly advantageous for vaporized nitrogen to be supplied to the combustion chamber of the engine. This means that harmful exhaust emissions are reduced, comparable to the exhaust gas recirculation.

In accordance with a further variation of the inventive method, liquid or vaporizing oxygen is used as cryogenic medium and this is supplied to the vehicle engine for the combustion in the gaseous state. This creates the possibility of operating the hydrogen engine or rather the motor vehicle at zero emissions, provided a corresponding amount of liquid oxygen is taken along, in that the resulting $H_2O$ is condensed by way of suitable measures.

The additional object underlying the invention is to provide and design a motor-vehicle drive of the type described at the outset such that the hydrogen engine can also be operated at a storage pressure of the hydrogen conveyed in the motor vehicle which is below the required operational pressure level and to construct a motor-vehicle drive of this type such that it is suitable for carrying out the inventive method described above.

This additional object is accomplished in development of the invention in that, in the motor-vehicle drive, a cooling device is provided for cooling the hydrogen gas which is at a pressure below the operational pressure level to cryogenic temperatures and a compressor operating at cryogenic temperatures is provided for compressing the cold gas to the operational pressure level and that the high-pressure side of the compressor is connected to a second storage means for pressure gas.

With such an inventive motor-vehicle drive, a compression of the hydrogen gas to an operational pressure level required for the high-pressure injection is achieved, whereby the compressor used for this, which operates at cryogenic temperatures, has a much smaller size, a lower weight as well as smaller power requirements than would be necessary for a compressor operating at ambient temperature. Since a compressor operating at ambient temperature cannot be used in a vast number of motor vehicles due to its size and its drive requirements, it is the inventive motor-vehicle drive which first makes it at all possible to utilize the gaseous hydrogen in the pressure-gas storage means more or less completely for the combustion in the engine.

Any optional cooling device, in particular any optional thermal motor, can be provided for cooling the hydrogen gas to be compressed. It is, however, particularly advantageous for the cooling device to be operable with a cryogenic medium. The cooling device can therefore comprise, in particular, a vessel for receiving a cryogenic medium, in particular liquid nitrogen, oxygen, liquid argon and others. In addition, it is advantageous for a cooling device which is operable by means of a cryogenic medium to be designed such that the cold gas enthalpy of gaseous, i.e. vaporized cryogenic medium can be exploited for cooling the hydrogen to be compressed. The cooling device can therefore comprise, in particular, line means for drawing off the vaporizing cryogenic medium, to which the hydrogen gas which is to be cooled and compressed can be thermally coupled.

Within the scope of a particularly good utilization of the cooling capacity made available by the cooling device, it is advantageous for this to be of a multiple-stage design. This can, for example, be achieved when thermal motors operating at different temperature levels are provided or when the cooling device comprises a plurality of stages which can be operated with different cryogenic media at different respective boiling temperatures which are "more or less cryogenic" so that heat can be withdrawn from the hydrogen gas to be cooled at different temperature levels between ambient temperature and the cryogenic compression temperature. Preferably, staggered counterflow heat exchanger systems are used for a transmission of heat in a plurality of stages from the hydrogen gas which is to be cooled and compressed to the vaporized cryogenic medium which is hereby heated.

In a preferred embodiment of the inventive motor-vehicle drive, the high-pressure side of the compressor is, at least during the operation of the compressor, cooled by the cooling device, whereby an isothermal compression, i.e. a compression at minimum power required by the compressor, can, in particular, be carried out.

The hydrogen gas compressed by the cold compressor at cryogenic temperatures can, however, be heated to ambient temperature during transport into the second storage means for pressure gas or during storage within the second storage means or even during transport from the second storage means for pressure gas to the combustion chamber of the hydrogen engine. A motor-vehicle drive is, however, preferred, in which a heat exchanger is provided between the high-pressure side of the compressor and the second pressure-gas storage means for heating the hydrogen gas compressed to the operational pressure level. In this respect, it is particularly advantageous for the hydrogen which is to be cooled to flow through this heat exchanger since, in this case, the cooling capacity of the cooled and compressed hydrogen gas can be used for cooling the hydrogen gas still to be compressed and this makes the operation of the inventive motor-vehicle drive even more economic.

A preferred motor-vehicle drive is designed in accordance with an additional inventive concept such that the cooling device is connected to the engine for supplying vaporized cryogenic medium, in particular nitrogen or oxygen, to the combustion chamber of the engine. In the case of nitrogen, this can bring about a reduction in harmful exhaust emissions, comparable to the exhaust gas recirculation, and in the case of oxygen, the hydrogen engine can be operated free of emissions, provided the $H_2O$ resulting as product of combustion is condensed.

In addition, it is suggested that the motor-vehicle drive be designed such that the compressor can either be driven by the hydrogen engine or that the compressor has an electric drive which can be connected either to the electrical system of the motor vehicle or to a mains power supply separate from the vehicle, for example a battery independent of the electrical system of the motor vehicle which, for its part, can be charged by a local mains power supply.

In order to compress the hydrogen gas, it is conceivable to use a manual control for starting the cooling device as well as the cold compressor. However, a motor-vehicle drive is preferred, in which a control comprising a pressure sensor is provided for automatically switching on the compressor when the pressure in the first or in the second pressure-gas storage means drops below the operational pressure level necessary for the high-pressure injection.

It has proven to be just as advantageous for the motor-vehicle drive to comprise a control having a pressure sensor for switching off the compressor when the pressure in the second storage means for pressure gas exceeds a predeterminable value.

Finally, it is suggested that the motor-vehicle drive be constructed such that the high-pressure side of the compressor is connected not only to the second storage means for pressure gas but also to the motor-vehicle engine so that in the case of a medium or low load state, in particular, the compressed hydrogen gas can be supplied directly to the engine without first being stored in the second pressure-gas storage means.

Additional advantages, details and features of the invention result from the following description as well as the drawing of a preferred embodiment of the inventive motor-vehicle drive.

BRIEF DESCRIPTION OF THE DRAWING

FIG. 1 shows: a schematic illustration of part of a preferred embodiment of the inventive motor-vehicle drive with two pressure-gas storage means, a cooling device and a cold compressor.

The embodiment of the inventive motor-vehicle drive illustrated in the drawing comprises, in detail, a first storage means 2 for pressure gas, a cooling device 4, a compressor 6 operating at cryogenic temperatures and a second storage means 8 for pressure gas.

A first line 10 leads from the first pressure-gas storage means 2 to a low-pressure side 12 of the compressor 6 and hydrogen gas to be compressed is taken from the first pressure-gas storage means 2 and supplied to the compressor 6 via this line. A second line 16 leads away from the high-pressure side 14 of the compressor 6 and then branches into a line section 18 leading to the second pressure-gas storage means 8 as well as into a second line section 20 leading to the motor-vehicle engine which is not illustrated. The compressor 6 is driven by an electric drive 21.

The cooling device 4 comprises a vessel 22 for receiving a cryogenic medium 24, in the illustrated case liquid nitrogen. A filling line 26 opens into an upper region 25 of the vessel 22 and liquid nitrogen can be supplied to the vessel 22 via this line; a vapor line 28 also leads away from the upper region 25 of the vessel 22 for carrying off the liquid nitrogen vaporizing out of the vessel 22. Counterflow heat exchangers 30 and 32 are successively arranged in the vapor line 28 and the first line 10 conveying the hydrogen gas to be cooled. During operation of the motor-vehicle drive, heat is withdrawn from the hydrogen gas to be compressed via these counterflow heat exchangers 30 and 32 due to the vaporized cryogenic nitrogen. In this respect, the hydrogen gas is cooled to approximately 80° Kelvin and the vaporized nitrogen heated to ambient temperature.

A section 34 of the second line 16 leading away from the high-pressure side 14 of the cold compressor 6 is kept at the boiling temperature of the liquid nitrogen by means of a thermal coupling 36 which is in direct contact with the liquid nitrogen bath. The high-pressure side 14 of the compressor 6 is cooled, in particular, via this section 34 which is of significance for drawing off the compression heat released during compression.

A counterflow heat exchanger 38 is provided in the second line 16 and in the first line 10 between the counterflow heat exchangers 30 and 32; and the counterflow heat exchanger 32 which also interacts with the first line 10 is provided behind the heat exchanger 38 in the direction of flow. The cooling capacity of the compressed hydrogen gas which is to be heated up can therefore be used for cooling the hydrogen gas which is to be compressed and cooled, as explained previously for vaporized cryogenic nitrogen.

The cooling device illustrated here comprises four stages, a first stage formed by the thermal coupling 36 to the liquid nitrogen bath at 70° Kelvin as well as a second, third and fourth stage formed by the counterflow heat exchangers 30, 38 and 32, respectively. The heat exchangers are arranged in this order proceeding from low to high temperatures and dimensioned such that hydrogen to be compressed is cooled down from ambient temperature to at least approximately the temperature of the liquid nitrogen and that, thereby, the vaporized cryogenic nitrogen as well as the compressed cold hydrogen can be heated up to at least approximately ambient temperature.

To control the removal from the first pressure-gas storage means, the first line 10 has a check valve 40. A third line 42 leads from the first pressure-gas storage means to a section 44 of the second line 16 on the warm side. Provided the pressure in the first pressure-gas storage means is above the operational pressure level required for the high-pressure injection, hydrogen can be withdrawn from the first pressure-gas storage means 2 via this third line 42, via the section 44 on the warm side as well as via the second section 20 of the second line 16 branching off to the engine and supplied to the motor-vehicle engine for the combustion.

As soon as the pressure in the first pressure-gas storage means 2 falls below the operational pressure level, a stop valve 46 arranged in the third line 42 is closed and once the check valve 40 arranged in the first line 10 is opened hydrogen gas is withdrawn via the first line 10 and compressed to the operational pressure level in the inventive manner. Provided, however, hydrogen gas at a pressure above the operational pressure level is stored in the second pressure-gas storage means 8, hydrogen gas can be withdrawn from this second pressure-gas storage means 8 once a stop valve 48 arranged in the first section 18 of the second line 16 is opened and supplied via the second line section 20 to the motor-vehicle engine for the combustion.

Finally, a connecting line 50 with a stop valve 52 is provided between a section 54 of the first line 10 on the warm side and the second pressure-gas storage means 8. If, for example, during the filling up of the first pressure-gas storage means 2 the check valve 40 and the stop valve 52 are opened, the second pressure-gas storage means 8 is filled at the same time with hydrogen gas at the storage pressure of the gas pump.

The two pressure-gas storage means 2 and 8 are illustrated in the drawing as being of the same size which is, however, not in any way intended to imply the necessity of the two pressure-gas storage means having the same dimensions. The second pressure-gas storage means 8 can, in particular, have a smaller volume than the first pressure-gas storage means 2.

Furthermore, a control 60 having a pressure sensor 62 and 64 in each of the pressure-gas storage means 2 and 8, respectively, is provided. If the pressure in one of the pressure-gas storage means 2 or 8 falls below the operational pressure level required for the high-pressure injection, the compressor 6 is automatically started by the control 60 and the valves brought into the corresponding positions. Similarly, the control switches the compressor off automatically when the pressure in the second pressure-gas storage means 8 exceeds a predeterminable value.

What is claimed is:

1. A method for operating a motor-vehicle engine adapted to be driven by hydrogen gas comprising the steps of:
   storing hydrogen gas at a storage pressure and a storage temperature in a storage means;
   transferring the hydrogen gas from the storage means to a cooling device;
   cooling the hydrogen gas with the cooling device to a cryogenic temperature below the storage temperature;
   compressing the cooled hydrogen gas to an operational pressure above the storage pressure in a compressor operating at a cryogenic temperature; and
   injecting the compressed hydrogen gas at said operational pressure into the motor-vehicle engine.

2. The method of claim 1 comprising the further step of heating the hydrogen gas after said compressing step.

3. The method of claim 1, wherein the hydrogen gas is cooled by a cryogenic medium.

4. The method of claim 2, wherein the hydrogen gas is cooled and heated by a counterflow heat exchanger system.

5. The method of claim 1, wherein the compressing of the hydrogen gas is essentially carried out isothermally.

6. The method of claim 1, wherein the compressor is driven by the motor-vehicle engine.

7. The method of claim 6, wherein the compressor is used for regenerative braking of the motor-vehicle in that it is driven by a transmission of the motor vehicle during braking.

8. The method of claim 3, wherein vaporized cryogenic medium is supplied to a combustion chamber of the motor-vehicle engine.

9. The method of claim 8, wherein oxygen is used as the cryogenic medium and supplied to the motor-vehicle engine for combustion in a gaseous state.

10. A motor-vehicle drive comprising:
    a hydrogen engine;
    a first storage means for storing hydrogen gas at a storage pressure and a storage temperature;
    a cooling device for receiving hydrogen gas transferred from said first storage means, and cooling transferred hydrogen gas to a cryogenic temperature below the storage temperature;
    a compressor for compressing the cooled hydrogen gas at cryogenic temperatures to an operational pressure above the storage pressure; and
    a hydrogen injector for injecting hydrogen gas into said hydrogen engine at said operational pressure.

11. The motor-vehicle drive of claim 10, further comprising a second storage means for storing hydrogen gas at said operational pressure, said second storage means being connected to a high-pressure side of said compressor.

12. The motor-vehicle drive of claim 10, wherein said cooling device is adapted to be operated with a cryogenic medium.

13. The motor-vehicle drive of claim 10, wherein said cooling device is of a multiple-stage design.

14. The motor-vehicle drive of claim 11, wherein said high-pressure side of said compressor is adapted to be cooled by said cooling device.

15. The motor-vehicle drive of claim 11, wherein a heat exchanger for heating hydrogen gas compressed to said operational pressure is provided between said high-pressure side of said compressor and said second storage means.

16. The motor-vehicle drive of claim 15, wherein said heat exchanger is adapted for throughflow of hydrogen gas to be cooled.

17. The motor-vehicle drive of claim 12, wherein said cooling device is connected to said hydrogen engine for supplying vaporized cryogenic medium to a combustion chamber of said hydrogen engine.

18. The motor-vehicle drive of claim 10, wherein said compressor is adapted to be driven by said hydrogen engine.

19. The motor-vehicle drive of claim 10, wherein said compressor has an electric drive adapted to be connected to an electrical system of the motor vehicle.

20. The motor-vehicle drive of claim 10, wherein said compressor has an electric drive adapted for connection to an electric power supply separate from the motor vehicle.

21. The motor-vehicle drive of claim 11, further comprising a control having a pressure sensor for automatically switching on said compressor when the pressure in at least one of said first and second storage means drops below the operational pressure.

22. The motor-vehicle drive of claim 11, further comprising a control having a pressure sensor for automatically switching off said compressor when the pressure in said second storage means exceeds a predeterminable value.

23. The motor-vehicle drive of claim 11, wherein said compressor has a high pressure side connected to said motor-vehicle engine.

24. A hydrogen-operated motor-vehicle comprising a motor-vehicle drive as defined in claim 10.

* * * * *